United States Patent [19]
Wright

[11] Patent Number: 6,134,782
[45] Date of Patent: Oct. 24, 2000

[54] METHOD OF FORMING A ROCKET THRUST CHAMBER

[75] Inventor: Robert J. Wright, Charlestown, W. Va.

[73] Assignee: United Technologies Corporation, Hartford, Conn.

[21] Appl. No.: 09/201,516

[22] Filed: Nov. 30, 1998

[51] Int. Cl.[7] .................................................. B23P 15/00
[52] U.S. Cl. .................................. 29/890.01; 29/890.03; 29/527.2
[58] Field of Search ........................... 29/890.01, 890.03, 29/527.2, 890.02; 60/266, 267

[56] References Cited

U.S. PATENT DOCUMENTS

| | | | |
|---|---|---|---|
| 4,584,171 | 4/1986 | Niino et al. | 29/890.01 |
| 5,233,755 | 8/1993 | Vandendriessche | 60/222 |
| 5,249,357 | 10/1993 | Holmes et al. | 427/236 |
| 5,386,628 | 2/1995 | Hartman et al. | 29/890.01 |
| 5,473,817 | 12/1995 | Schnoor et al. | 29/890.01 |
| 5,477,613 | 12/1995 | Bales et al. | 29/890.01 |
| 5,546,656 | 8/1996 | Hartman et al. | 29/890.01 |

*Primary Examiner*—Irene Cuda
*Attorney, Agent, or Firm*—Christopher T. Hayes

[57] ABSTRACT

A method of making a rocket thrust chamber is described in which molten metal is sprayed onto the outer shell of a cooling tube bundle, and the ends of tubes are covered with predetermined thicknesses of the metal. Circumferentially extending manifold channels that intersect each of the tube ends are then machined into the predetermined thicknesses of metal, and mating assemblies are attached to enclose the manifold channels.

1 Claim, 7 Drawing Sheets

METHOD OF FORMING A ROCKET THRUST CHAMBER

FIELD OF THE INVENTION

This invention is related to rocket engines, and particularly to a process for forming manifolds for rocket engine thrust chambers.

BACKGROUND OF THE INVENTION

Rocket engines, such as those used to launch satellites, are costly to design and manufacture. At the same the demand for rocket engines capable of carrying payloads to space or near-Earth orbits continues to grow. Consequently, manufacturers of such rocket engines are constantly seeking new ways to reduce the design and manufacturing costs of producing rocket engine components.

One such component is the rocket thrust chamber within which the propellants of the rocket engine are combusted and accelerated. Because of the extremely high temperatures of the propellants moving through the thrust chamber, the walls of the thrust chamber must be cooled in those applications that require sustained engine firings. Such cooling is typically accomplished by flowing a coolant through tubes that form the inner wall of the thrust chamber. Since the manufacture of such thrust chambers is costly, novel ways of manufacturing such thrust chambers have been developed.

One example of the manufacture of such a thrust chamber is shown in U.S. Pat. No. 5,375,325 to Bales et al., which discloses a rocket chamber produced by positioning sleeved cooling tubes within a structural jacket to form a tube bundle, and positioning a liner within the tube bundle thereby sandwiching the tubes between the jacket and the liner. The tubes are then subjected to high internal pressure and inflated at high temperature while the liner is simultaneously subjected to the same high pressure, thereby forcing the sleeved tubes into intimate contact with adjacent sleeved tubes, the liner and the jacket. The temperature is maintained until bonding has occurred between the liner, sleeved tubes and jacket.

While the aforementioned patent represents an improvement over the prior art, the manufacture of the structural jacket which is used in the manufacture requires a great deal of machining, and each end of each of the tubes must be individually welded into manifold channels in the jacket. The time and effort associated with this machining and welding represents a significant portion of the manufacturing cost of the thrust chamber.

What is needed is a method of making a rocket thrust chamber requires less machining to form a structural jacket, and eliminates the need for each end of each of the tubes to be individually welded into manifold channels in the jacket.

SUMMARY OF THE INVENTION

It is therefore an object of the present invention to provide a method for forming a rocket thrust chamber that reduces the amount of machining required to form a structural jacket, as compared to the prior art.

Another object of the present invention to provide a method for forming a rocket thrust chamber which eliminates the need for each end of each of the tubes to be individually welded into manifold channels in the jacket.

According to the method of the present invention, method of making a rocket thrust chamber is disclosed in which molten metal is sprayed onto the outer shell of a cooling tube bundle, and the ends of tubes are covered with predetermined thicknesses of the metal. Circumferentially extending manifold channels that intersect each of the tube ends are then machined into the predetermined thicknesses in of metal, and mating assemblies are attached to enclose the manifold channels.

The foregoing and other features and advantages of the present invention will become more apparent from the following description and accompanying drawings.

BEST MODE FOR CARRYING OUT THE INVENTION

Figure 1:
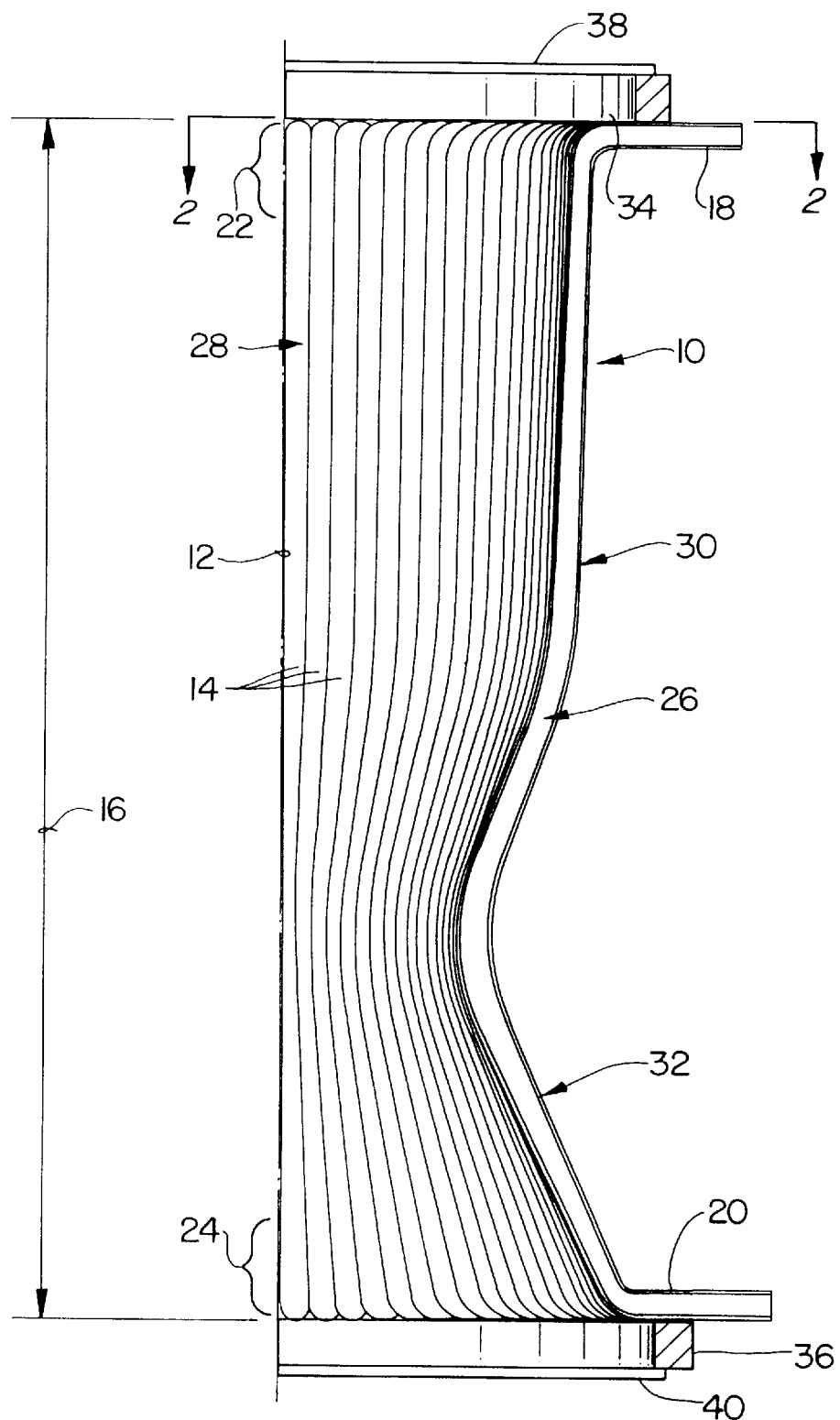
FIG. 1 is a cross-sectional view of a quarter section of the tube bundle used in the method of making the rocket thrust chamber of the present invention.

The method of the present invention is practiced by applying a spray of molten metal onto a tube bundle 10 such as the one shown in the sectional view of FIG. 1. This metal spraying process is commonly referred to as Vacuum Plasma Spray ("VPS") by those skilled in the art. It is to be understood that FIG. 1 shows only ¼ of the tube bundle 10, and that the entire tube bundle 10 is symmetric about a longitudinally extending reference axis 12. The tube bundle 10 includes a plurality of cooling tubes 14 that are circumferentially located about a longitudinally extending reference axis 12. The longitudinal axis 12 defines the axis of symmetry for the tube bundle 10, and, as shown in FIG. 1, each of the tubes extends along the longitudinal 12 in spaced relation thereto.

Figure 2:
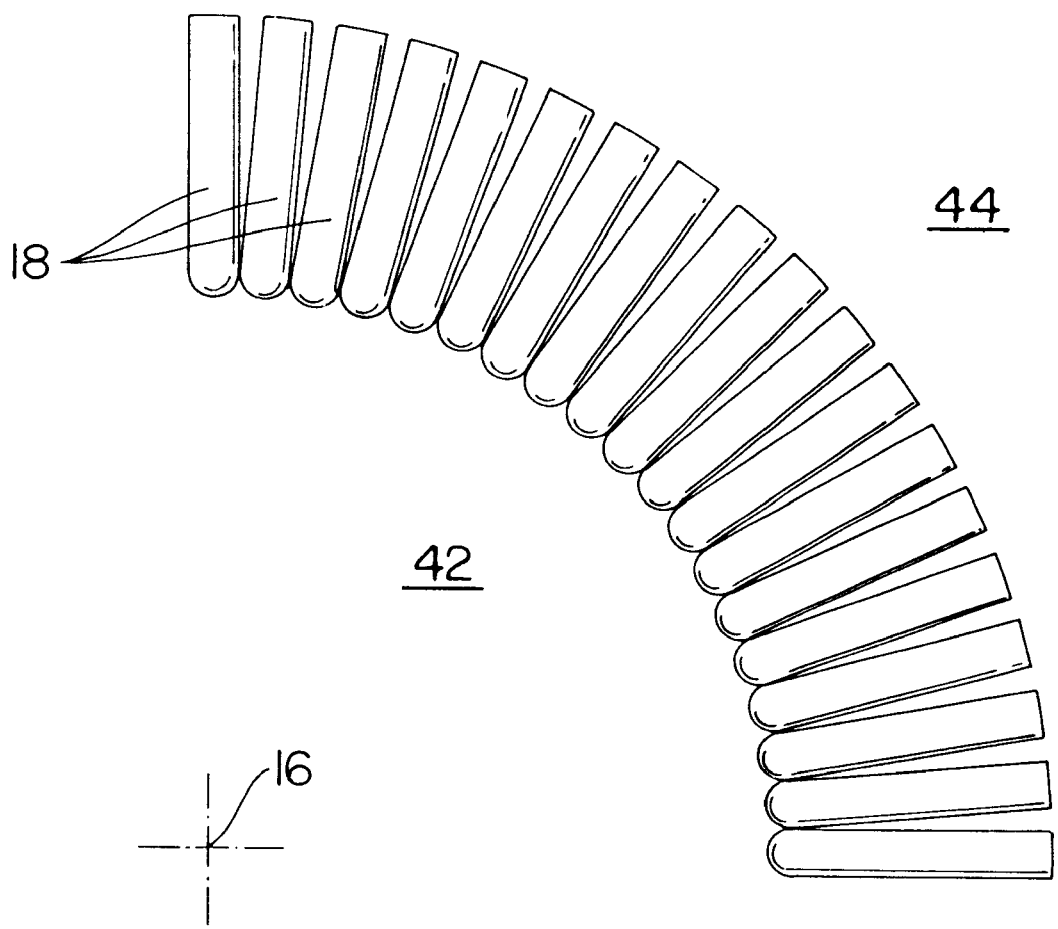
FIG. 2 is a cross-sectional view of the assembly of FIG. 1 taken along line 2—2 of FIG. 1.

Each of the tubes 14 is bonded to two of the tubes 14 immediately adjacent thereto along the entire length 16 which the tubes 14 extend along the longitudinal axis 12. This bonding, which is preferably accomplished by brazing, fills the interstices between adjacent tubes 14, thereby preventing the spray of molten metal from infiltrating into the interior of the tube bundle 10 during the metal spraying process described below. Each of the tubes 14 has a first tube end 18 and a second tube end 20, and each of the first tube ends is in spaced relation to each of the other first tube ends, as shown in FIG. 2. Likewise, each of the second tube ends 20 is in spaced relation to each of the other second tube ends 20 (not shown).

As shown in FIG. 1, each of the first tube ends 18 is located radially outward of a first segment 22 of the longitudinal axis 12, and each of the second tube ends 20 is located radially outward of a second segment 24 of the longitudinal 12 As shown in FIG. 1, the outer surface 26 of each of the tubes 14 comprises a radially inward portion 28 and a radially outward portion 30. The radially inward portion 28 of each tube 14 faces the longitudinal 12 in, and the radially outward portion 30 of each tube 14 faces away from the longitudinal axis 12. Collectively, the radially outward portions 30 define the tube bundle outer shell 32.

A first structural ring 34 is secured to the first tube ends 18, and a second structural ring 36 is secured to the second tube ends 20 such that tube bundle 10 is sandwiched between the first and second structural rings 34, 36, as shown in FIG. 1. The structural rings 34, 36 are made of the same metal that is used in the spraying process described below, and each of the structural rings 34, 36 is preferably secured to the immediately adjacent tube ends 18, 20 by brazing. A lid 38, 40 is secured to each of the structural rings 34, 36, thereby isolating the inner cavity 42 of the tube bundle 10 from the ambient environment 44, as shown in FIG. 2.

Figure 3:
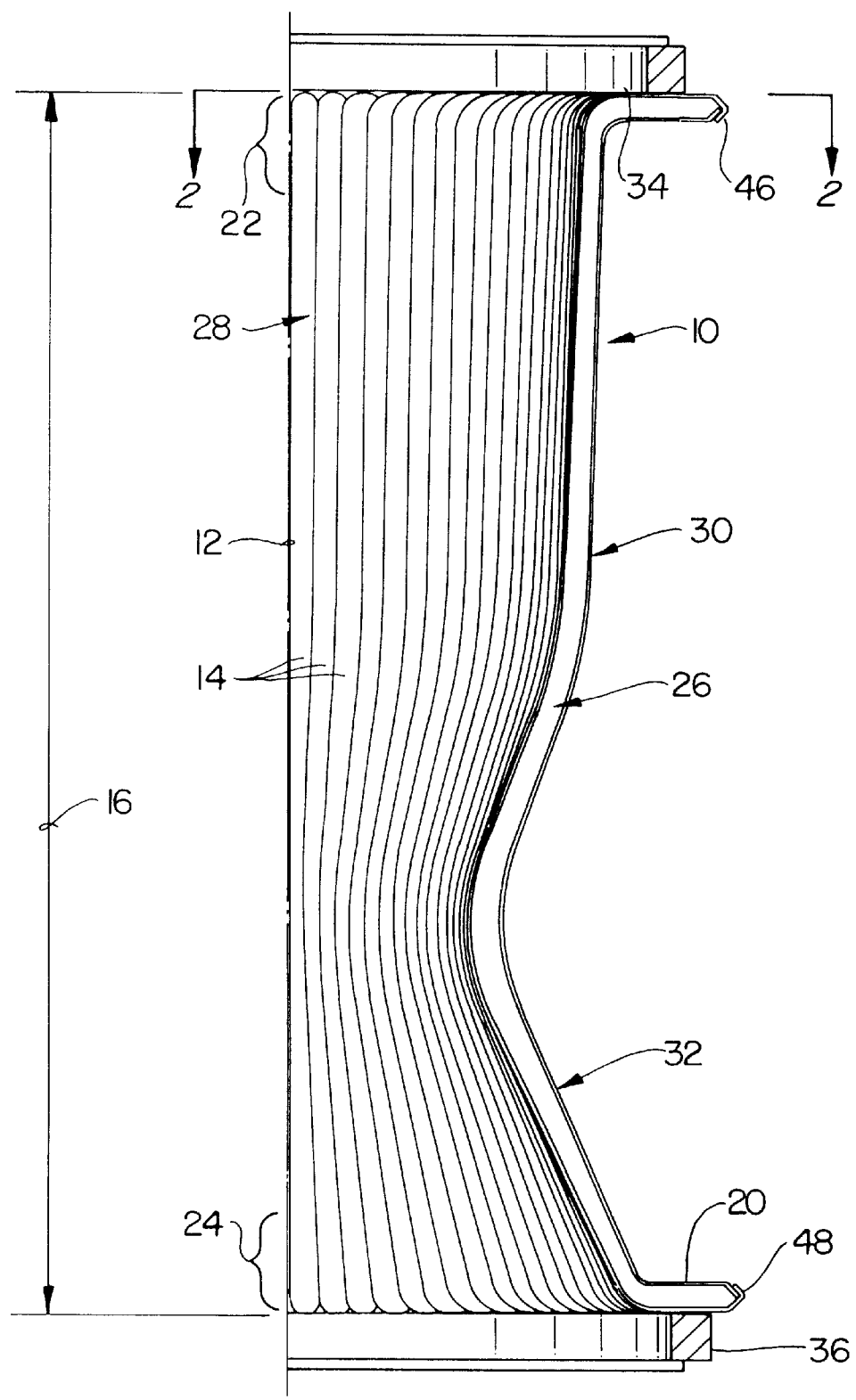
FIG. 3 shows the assembly of FIG. 1 with the tubes ends crimped to form the sealed tips.
Figure 4:
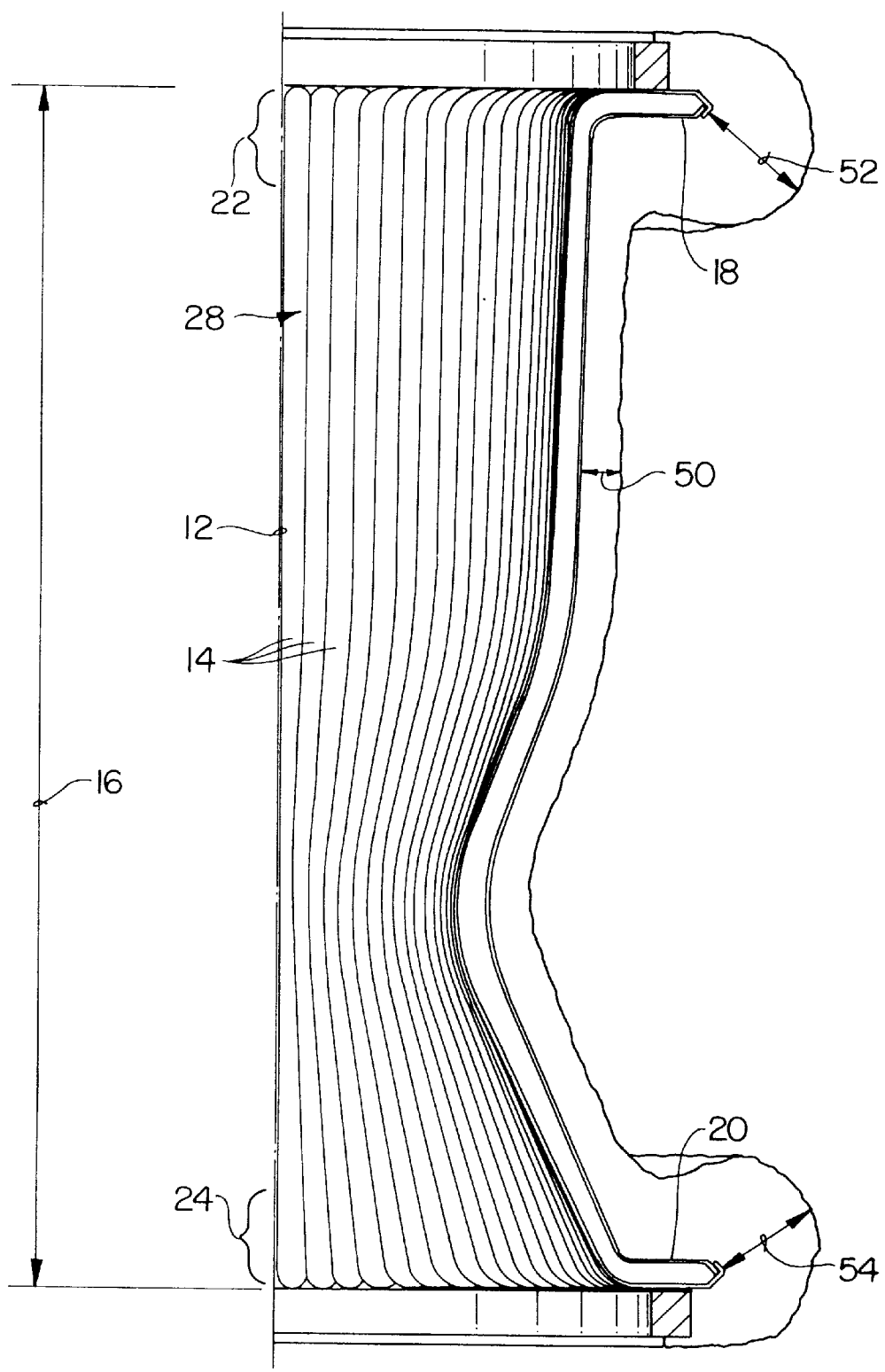
FIG. 4 shows the assembly of FIG. 3 after the various thicknesses of metal have been sprayed onto the assembly.

Each of the first and second tube ends 18, 20 is then sealed, preferably by crimping each tube end 18, 20 and folding it back onto its respective tube 14, thereby defining a sealed tip 46, 48 at each of the first and second tube ends 18, 20, as shown in FIG. 3. The tube bundle 10, with the attached rings 34, 36 and lids 38, 40, is then placed into a VPS chamber of the type known in the art, and molten metal, preferably steel or a steel alloy, is sprayed onto the tube bundle outer shell 32 and the first and second tube ends 18, 20, until a first predetermined thickness 50 of the metal covers the tube bundle outer shell 32, as shown in FIG. 4. Additional amounts of molten metal are then sprayed onto the first tube ends 18 until a second predetermined thickness 52 of metal covers the first tube ends 18, and additional amounts of molten metal are sprayed onto the second tube ends 20 until a third predetermined thickness 54 of metal covers the second tube ends 20.

Figure 5:
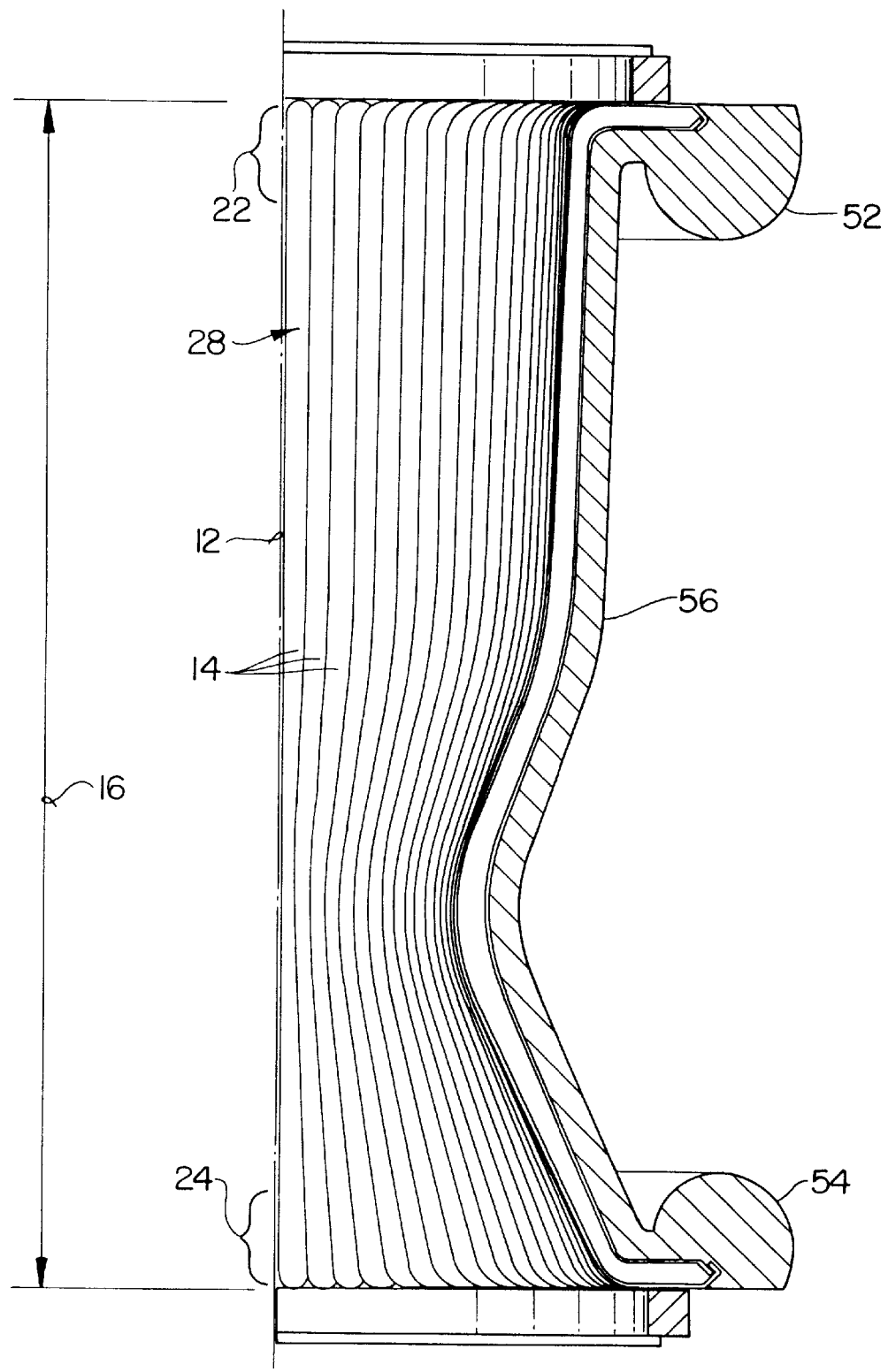
FIG. 5 shows the assembly of FIG. 4 after the lids have been removed and the sprayed metal has been machined to form the structural jacket.
Figure 6:
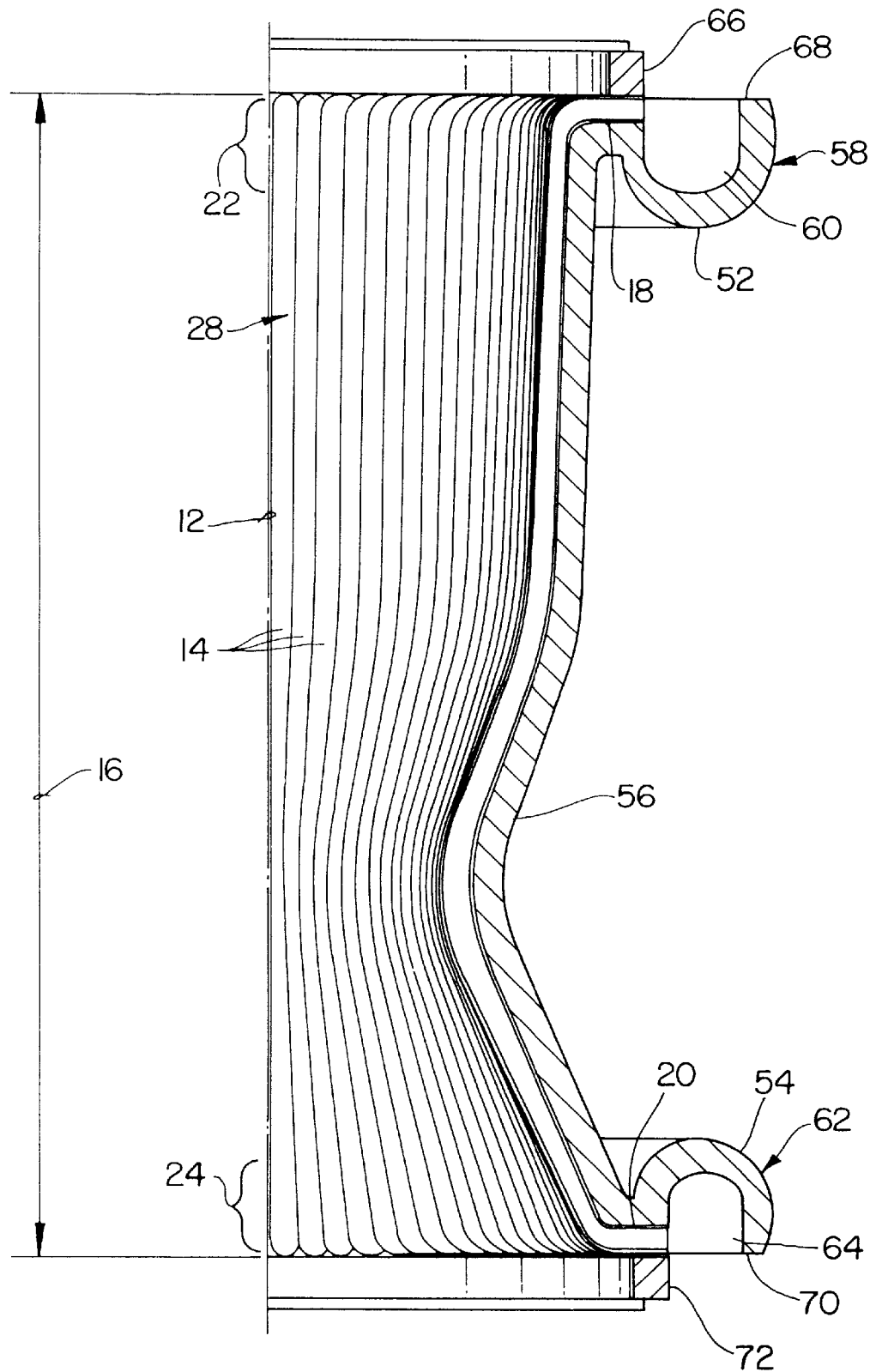
FIG. 6 shows the assembly of FIG. 5 after the sealed tips of the tubes have been machined away and the manifold channels have been machined into the jacket.

Once the sprayed metal has reached the desired thicknesses 50, 52, 54, additional processing (e.g. heat treatment) is performed to produce the desired material characteristics in the sprayed metal. After the additional processing has been completed, the lids 38, 40 are removed and excess sprayed metal is machined away yielding the desired structural jacket 56 encasing the tube bundle 10, as shown in FIG. 5. The inlet manifold 58, as shown in FIG. 6, is formed by machining a first circumferential channel 60 in the second predetermined thickness 52 of metal by machining away some of the second predetermined thickness 52 of metal and the sealed tip 46 of each of the first tube ends 18, and the outlet manifold 62 is formed by machining a second circumferential channel 64 in the third predetermined thickness 54 of metal by machining away some of the third predetermined thickness 54 of metal and the sealed tip 48 of each of the second tube ends 20. The resulting structural jacket 56, as shown in FIG. 6, includes circumferentially extending inlet and outlet manifold channels 60, 64. After the machining operation is complete, additional processing (e.g. Hot Isostatic Pressing) is performed to produce the final desired material characteristics in the sprayed metal.

Figure 7:
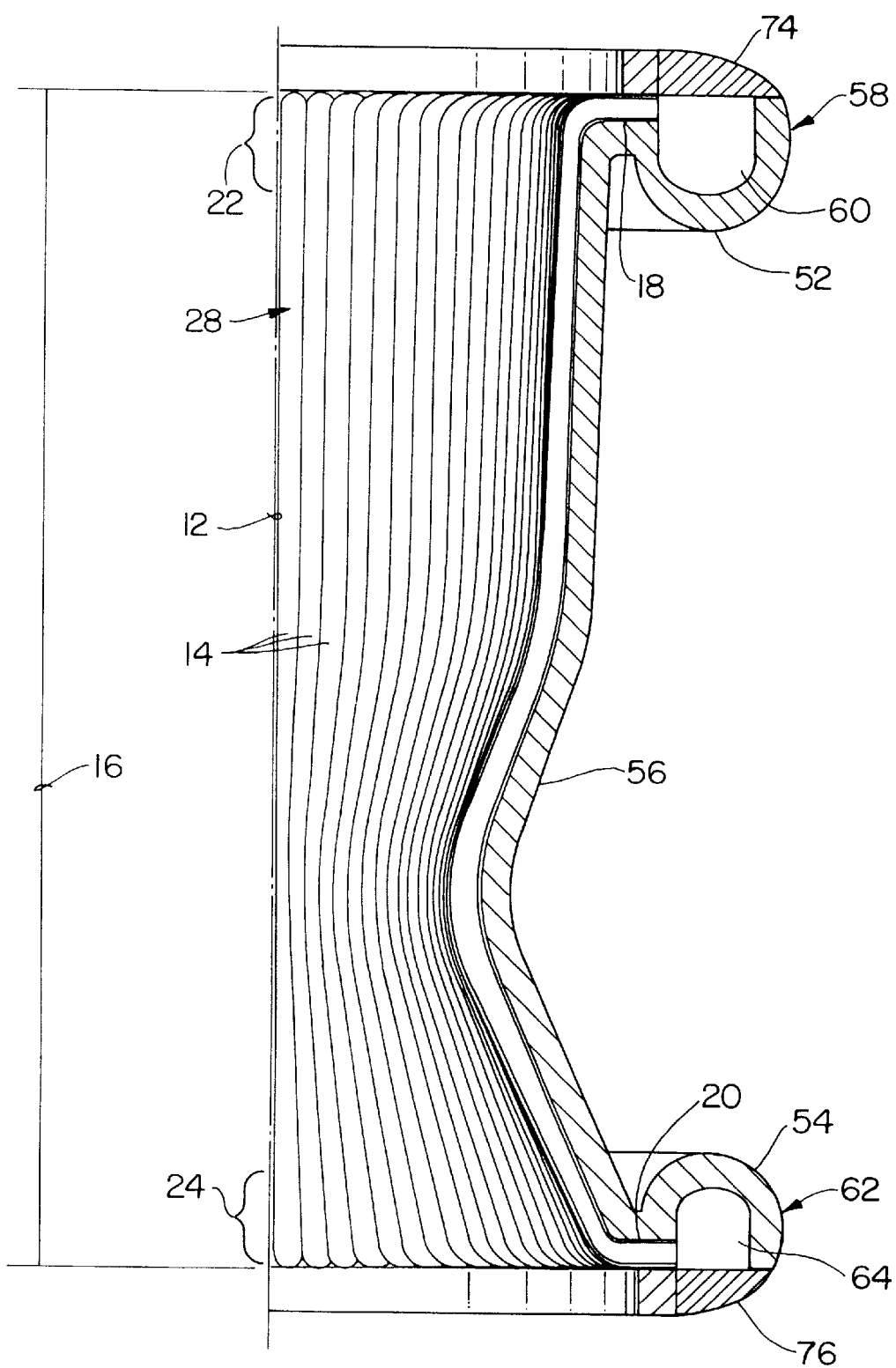
FIG. 7 shows the assembly of FIG. 6 of with the mating assembly is welded to the manifold lands.

The inlet manifold channel 60 is bounded by inlet manifold lands 66, 68, and the outlet manifold channel 64 is bounded by outlet manifold lands 70, 72, as shown in FIG. 6. As shown in FIG. 7, a first mating assembly 74, which has been machined to fit the inlet manifold lands 66, 68 is sealingly attached to the inlet manifold lands 66, 68 of the second predetermined thickness 52 of metal, and a second mating assembly 76, which has been machined to fit the outlet manifold lands 70, 72, is sealingly attached to the third predetermined thickness 54 of metal. The mating assemblies 74, 76, which are made of the same metal as the jacket 56, preferably are sealingly attached to the jacket 56 by welding the mating assemblies 74, 76 to the manifold lands 60, 68, 70, 72 immediately adjacent thereto. Once the circumferential channels 60, 64 have been enclosed by the mating assemblies 74, 76, fluid, such as coolant, can only enter or exit the cooling tubes 14 through orifices (not shown) in the manifolds.

As those skilled in the art will readily appreciate, the method of the present invention requires less machining than the prior art to form a structural jacket, since only the outer surface of the structural jacket needs to be machined. Furthermore, the need to individually weld each of the cooling tubes into the manifold channels in the jacket is eliminated, since the molten metal sprayed onto the tube ends during the jacket formation seals each of the tube ends to the structural jacket. Accordingly, the time and effort, and the attendant cost, necessary to manufacture the thrust chamber is reduced as compared to the prior art.

Although this invention has been shown and described with respect to detailed embodiments thereof, it will be understood by those skilled in the art that various changes in form and detail thereof may be made without departing from the spirit and scope of the claimed invention.

I claim:

1. A method of making a rocket thrust chamber, said method comprising:

providing a tube bundle including a plurality of tubes, said tube bundle having a longitudinal axis defined therethrough, each of said tubes extending along said longitudinal axis in spaced relation thereto, each of said tubes is bonded to two of said tubes immediately adjacent thereto along a first length that the tubes extend along said axis, each of said tubes having a first tube end and a second tube end, each of said first tube ends in spaced relation to each of said other first tube ends and located radially outward of a first segment of said reference axis, and each of said second tube ends in spaced relation to each of said other second tube ends and located radially outward of a second segment of said reference axis, the outer surface of each of said tubes comprises a radially inward portion and a radially outward portion, the radially inward portion of each tube faces said axis and the radially outward portion of each tube faces away from said axis, said radially outward portions collectively defining a tube bundle outer shell, sealing said first and second tube ends, thereby defining a sealed tip at each of said first and second tube ends, spraying molten metal onto said tube bundle outer shell and said first and second tube ends until a first predetermined thickness of said metal covers said tube bundle outer shell, spraying additional amounts of molten metal onto said first tube ends until a second predetermined thickness of metal covers said first tube ends, spraying additional amounts of molten metal onto said second tube ends until a third predetermined thickness covers said second tube ends, forming a first circumferential channel in said second predetermined thickness of metal by machining away some of said second predetermined thickness of metal and the sealed tip of each of said first tube ends, and forming a second circumferential channel in said third predetermined thickness of metal by machining away some of said third predetermined thickness of metal and the sealed tip of each of said second tube ends;

enclosing said first circumferential channel by sealingly attaching a first mating assembly to said second predetermined thickness of metal, and enclosing said second circumferential channel by sealingly attaching a second mating assembly to said third predetermined thickness of metal.

* * * * *